United States Patent
Kuriuzawa et al.

(10) Patent No.: US 6,920,092 B2
(45) Date of Patent: Jul. 19, 2005

(54) SEEK CONTROL METHOD AND STORAGE APPARATUS

(75) Inventors: Toshio Kuriuzawa, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 668 days.

(21) Appl. No.: 09/963,965

(22) Filed: Sep. 26, 2001

(65) Prior Publication Data

US 2002/0181346 A1 Dec. 5, 2002

(30) Foreign Application Priority Data

May 30, 2001 (JP) ..................................... 2001-163255

(51) Int. Cl.[7] .............................................. G11B 7/00
(52) U.S. Cl. ....................... 369/44.28; 369/53.2; 369/93
(58) Field of Search ............................... 369/15, 44.26, 369/44.27, 44.28, 44.29, 44.31, 44.35, 47.55, 53.22, 53.23, 53.28, 53.29, 53.37, 93, 53.2

(56) References Cited

U.S. PATENT DOCUMENTS

| | | |
|---|---|---|
| 5,268,883 A | 12/1993 | Yamaguchi et al. |
| 5,740,137 A | 4/1998 | Kim ........................ 369/44.28 |
| 6,044,049 A | 3/2000 | Fujiune et al. ........... 369/44.29 |
| 2001/0053119 A1 | 12/2001 | Tanaka et al. ........... 369/275.3 |

FOREIGN PATENT DOCUMENTS

| | | |
|---|---|---|
| JP | 2-061829 | 3/1990 |
| JP | 4-195734 | 7/1992 |
| JP | 5-159318 | 6/1993 |
| JP | 5-189797 | 7/1993 |
| JP | 8-171727 | 6/1996 |
| JP | 9-054958 | 2/1997 |
| JP | 10-275352 | 10/1998 |
| JP | 11-167729 | 6/1999 |

*Primary Examiner*—Paul W. Huber
(74) *Attorney, Agent, or Firm*—Greer, Burns & Crain, Ltd

(57) ABSTRACT

A seek control method carries out a seek to a target position on a recording medium by moving a light beam spot which is irradiated on the recording medium. The recording medium has a first region in which information recording is made as variations in optical or magneto-optical properties and a second region in which information recording is made as variations in geometrical configuration, and the first and second regions are provided in different areas on a recording surface of the recording medium. The seek control method includes the step of carrying out a control so that a seek operation from a seek start position within the first region to a seek target position within the second region and a seek operation from a seek start position within the second region to a seek target position within the first region differ.

17 Claims, 10 Drawing Sheets

SEEK CONTROL METHOD AND STORAGE APPARATUS

BACKGROUND OF THE INVENTION

This application claims the benefit of a Japanese Patent Application No. 2001-163255 filed May 30, 2001, in the Japanese Patent Office, the disclosure of which is hereby incorporated by reference.

1. Field of the Invention

The present invention generally relates to seek control methods and storage apparatuses, and more particularly to a seek control method for making a seek to a desired track on a recording medium such as an optical disk, and to a storage medium which employs such a seek control method.

2. Description of the Related Art

In a conventional magneto-optical disk, a track to which information is recorded and from which the information is reproduced, is formed in a land or a groove of the magneto-optical disk. In addition, a ROM region which is recorded with control information such as information peculiar to the medium is provided in an inner peripheral zone of the magneto-optical disk, and a RAM region to which data is recorded and from which the data is reproduced is provided in other zones, for example. In the ROM region, the control information is recorded as variations in geometrical configuration such as pits. In the RAM region, the data is recorded and reproduced by a magneto-optical system.

A seek to a desired track on the magneto-optical disk may be carried out within the RAM region, from the RAM region to the ROM region or, from the ROM region to the RAM region. Normally, when making the seek to the desired track from an arbitrary track, a tracking error signal (TES) is used. More particularly, a number of tracks traversed is counted from a time when a light beam spot starts to move from the arbitrary track by use of the TES, so as to detect whether or not the desired track is reached.

Generally, when a moving distance of the light beam spot during the seek is long, a moving speed of the light beam spot becomes high, and there is a possibility of making an error when the number of tracks traversed is counted using the TES. However, a track pitch of the conventional magneto-optical disk is relatively large, and a ratio of TES amplitudes obtained in the RAM and ROM regions is 1:08, for example, and a difference between the TES amplitudes obtained in the RAM and ROM regions is not very large. For this reason, the possibility of making an error when the number of tracks traversed is counted using the TES is small even when the seek is made from the RAM region to the ROM region.

However, in addition to the magneto-optical disk unit which records and/or reproduces (records/reproduces) information with respect to only the land or the groove of the magneto-optical disk, a magneto-optical disk unit has been proposed which records/reproduces the information with respect to both the land and the groove of the magneto-optical disk. By employing the so-called land-groove recording system which records the information on both the land and the groove of the magneto-optical disk, it is possible to increase the recording density on the magneto-optical disk.

In the magneto-optical disk which employs the land-groove recording system, the track pitch is extremely small. Hence, it is necessary to amplify the TES to make it easier to read the TES and prevent an error from being made when counting the number of tracks traversed.

But in the case of the magneto-optical disk which employs the land-groove recording system, the ratio of the TES amplitudes obtained from the RAM and ROM regions is 1:0.4, for example, and the difference between the TES amplitudes obtained in the RAM and ROM regions is large. For this reason, even when the TES is amplified, the possibility of making an error when counting the number of tracks traversed is large if the same circuit is used to read the TES obtained from the RAM and ROM regions. In other words, if the sensitivity of the count is adjusted to suit the TES obtained from the RAM region, the sensitivity becomes insufficient for reading the TES obtained from the ROM region. On the other hand, if the sensitivity of the count is adjusted to suit the TES obtained from the ROM region, the sensitivity becomes too sensitive for reading the TES obtained from the RAM region.

If the error is generated when counting the number of tracks traversed, the desired track cannot be reached by one seek, and it takes time to complete the seek because of the need to carry out a seek retry a number of times. Particularly when loading the magneto-optical disk, it becomes necessary to first make a seek to the ROM region in order to read the control information such as the storage capacity and disk type of the loaded magneto-optical disk, but it is undesirable that a long time is required to make this seek.

In addition, when the circuit is designed to suit the TES amplitude obtained from the RAM region, the TES cannot be detected correctly from the ROM region, and a tracking servo cannot be carried out normally in the ROM region. Similarly, when the circuit is designed to suit the TES amplitude obtained from the ROM region, the TES cannot be detected correctly from the RAM region, and a tracking servo cannot be carried out normally in the RAM region. Therefore, in either case, it becomes impossible to obtain an on-track state with respect to the desired track.

SUMMARY OF THE INVENTION

Accordingly, it is a general object of the present invention to provide a novel and useful seek control method and storage apparatus, in which the problems described above are eliminated.

Another and more specific object of the present invention is to provide a seek control method and storage apparatus, which can correctly carry out a seek at a high speed and enable a normal tracking servo, even when a TES amplitude which is obtained differs depending on a region on a recording medium from which the TES is obtained.

Still another object of the present invention is to provide a seek control method for carrying out a seek to a target position on a recording medium by moving a light beam spot which is irradiated on the recording medium, where the recording medium has a first region in which information recording is made as variations in optical or magneto-optical properties and a second region in which information recording is made as variations in geometrical configuration, the first and second regions are provided in different areas on a recording surface of the recording medium, and the seek control method comprises the step of (a) carrying out a control so that a seek operation from a seek start position within the first region to a seek target position within the second region and a seek operation from a seek start position within the second region to a seek target position within the first region differ. According to the seek control method of the present invention, it is possible to correctly carry out a seek at a high speed and enable a normal tracking servo, even when a TES amplitude which is obtained differs depending on a region on a recording medium from which the TES is obtained.

The seek control method may further comprise the step of (b) judging a type of the recording medium, and the step (a) may carry out a different seek operation when the step (b) judges that the recording medium is a high-density recording medium.

A further object of the present invention is to provide a seek control method for carrying out a seek to a target position on a recording medium by moving a light beam spot which is irradiated on the recording medium, where the recording medium has a first region in which information recording is made as variations in optical or magneto-optical properties and a second region in which information recording is made as variations in geometrical configuration, the first and second regions are provided in different areas on a recording surface of the recording medium, and the seek control method comprises the step of (a) carrying out a control to carry out a first seek operation from a seek start position to a first end position within the first region and in a vicinity of the second region when the seek start position is within the first region and a seek target position is within the second region, and to carry out a second seek from the first end position to a second end position by regarding the second end position as the seek target position, where the first seek operation is carried out by setting control parameters to those for the first region, and the second seek operation is carried out by setting the control parameters to those for the second region. According to the seek control method of the present invention, it is possible to correctly carry out a seek at a high speed and enable a normal tracking servo, even when a TES amplitude which is obtained differs depending on a region on a recording medium from which the TES is obtained.

The control parameters may include at least one of a gain of a tracking error signal, an off-track detection slice, and a power of the light beam.

Another object of the present invention is to provide a storage apparatus for carrying out a seek to a target position on a recording medium by moving a light beam spot which is irradiated on the recording medium, where the recording medium has a first region in which information recording is made as variations in optical or magneto-optical properties and a second region in which information recording is made as variations in geometrical configuration, the first and second regions are provided in different areas on a recording surface of the recording medium, and the storage apparatus comprises control means for carrying out a control so that a seek operation from a seek start position within the first region to a seek target position within the second region and a seek operation from a seek start position within the second region to a seek target position within the first region differ. According to the storage apparatus of the present invention, it is possible to correctly carry out a seek at a high speed and enable a normal tracking servo, even when a TES amplitude which is obtained differs depending on a region on a recording medium from which the TES is obtained.

Other objects and further features of the present invention will be apparent from the following detailed description when read in conjunction with the accompanying drawings.

DESCRIPTION OF THE PREFERRED EMBODIMENTS

Figure 1:
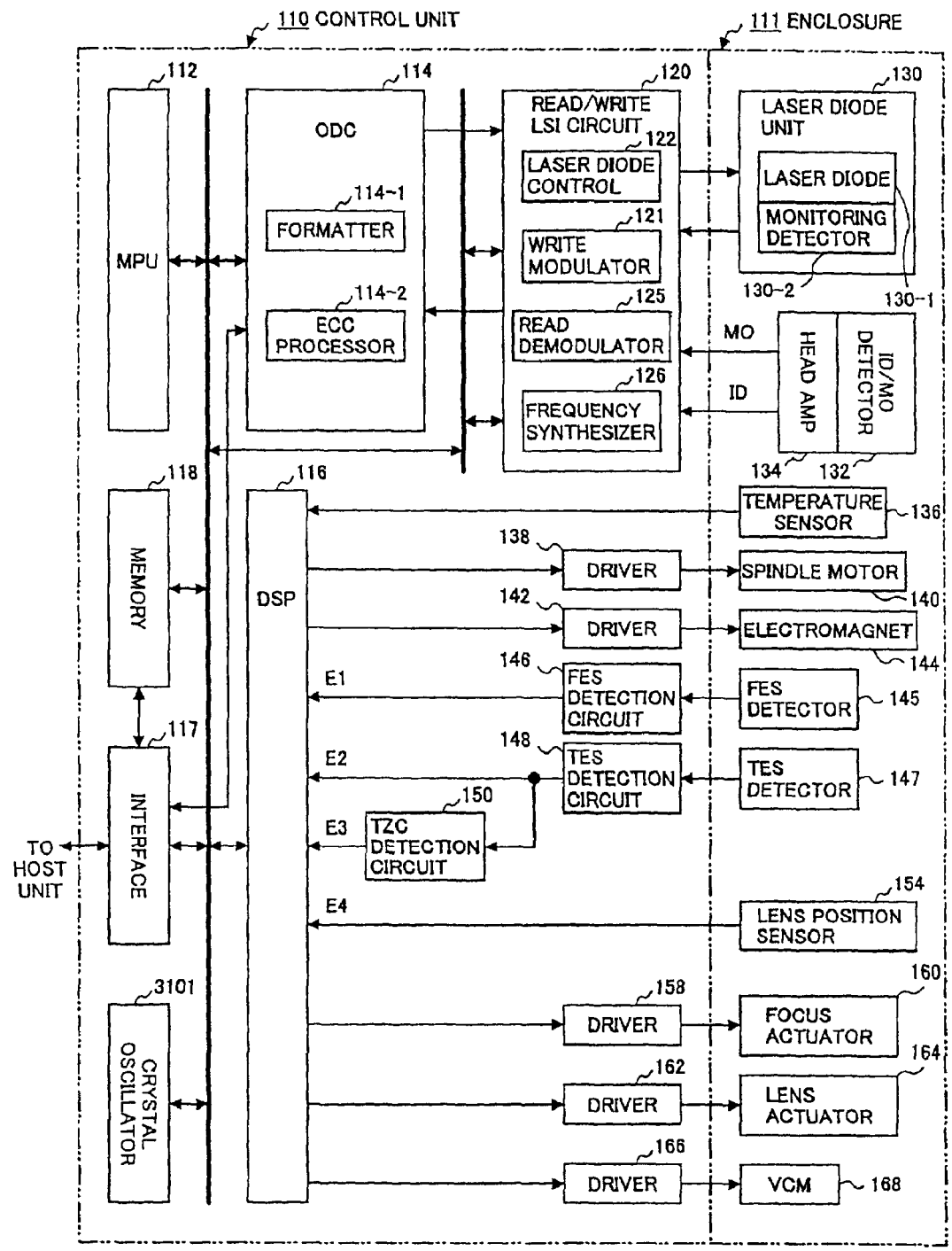
FIG. 1 is a system block diagram showing a structure of a first embodiment of a storage apparatus according to the present invention.

A description will be given of embodiments of a seek control method according to the present invention and a storage apparatus according to the present invention, by referring to the drawings.

FIG. 1 is a system block diagram showing the structure of a first embodiment of the storage apparatus according to the present invention. As shown in FIG. 1, the optical disk unit generally includes a control unit 110 and an enclosure 111. The control unit 110 includes a microprocessor unit (MPU) 112 which generally controls the operation of the optical disk unit, an interface 117 which exchanges commands and data between a host unit (not shown), an optical disk controller (ODC) 114 which carries out processes required to read and write data with respect to an optical disk (not shown), a digital signal processor (DSP) 116, and a memory 118. The memory 118 is used in common by the MPU 112, the ODC 114 and the interface 114, and for example, includes a dynamic random access memory (DRAM), a nonvolatile memory which stores control programs and flag information, or the like. A crystal oscillator 3101 is coupled to the MPU 112.

The ODC 114 includes a formatter 114-1 and an error correction code (ECC) processor 114-2. At the time of a write access, the formatter 114-1 divides NRZ write data into sector units of the optical disk and generates a recording format, and the ECC processor 114-2 generates and adds an ECC with respect to sector write data units and also generates and adds if necessary a cyclic redundancy check (CRC) code. Further, the ECC processor 114-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 114-2. Further, the NRZ data in sector units are connected in the formatter 114-1 so as to transfer a NRZ read data stream to the host unit.

A read/write large scale integrated (LSI) circuit 120 is provided with respect to the ODC 114. This read/write LSI circuit 120 includes a write modulator 121, a laser diode control circuit 122, a read demodulator 125 and a frequency synthesizer 126. A control output of the laser diode control circuit 122 is supplied to a laser diode unit 130 which is provided in an optical unit of the enclosure 111. The laser diode unit 130 integrally includes a laser diode 130-1 and a monitoring detector 130-2. The write modulator 121 converts the write data into the data format of the pit position modulation (PPM) recording (or mark recording) or, a pulse width modulation (PWM) recording (or edge recording).

When recording and reproducing data with respect to the optical disk using the laser diode unit 130, this embodiment uses a writable magneto-optical (MO) cartridge medium employing the PWM recording which records the data in correspondence with the existence of mark edges on the optical disk. In addition, the recording format used by the optical disk is a 2.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 112 based on pit intervals of the ID portion. The MPU 112 notifies the recognition result indicating the type of optical disk to the ODC 114. For example, the type which is recognized may include information that the optical disk is a 3.5-inch disk and has a storage capacity of 128 MB, 230 MB, 540/640 MB, 1.3 GB or 2.3 GB.

The read/write LSI circuit 120 is also provided as a read system with respect to the ODC 114. The read demodulator 125 and the frequency synthesizer 26 are provided in the read/write LSI circuit 120, as described above. An ID/MO detector 132 of the enclosure 111 detects a laser beam emitted from the laser diode 130-1 and returned via the optical disk, and a detection signal from this ID/MO detector 132 is input as an ID signal (embossed pit signal) and a MO signal to the read/write LSI circuit 120 via a head amplifier 134.

The read demodulator 125 of the read/write LSI circuit 120 includes the functions of circuits such as an automatic gain control (AGC) circuit, a filter and a sector mark detection circuit. Hence, the read demodulator 125 generates a read clock and read data from the input ID signal and MO signal, and demodulates the PWM data back into the original NRZ data. In addition, since the ZCAV system is employed, the MPU 112 controls a setting of a frequency dividing ratio with respect to the frequency synthesizer 126 of the read/write LSI circuit 120 in order to generate a clock frequency in correspondence with the zone.

The frequency synthesizer 126 is a phase locked loop (PLL) circuit having a programmable frequency divider, and generates as a read clock a reproducing reference clock having a predetermined specific frequency depending on the zone position on the optical disk. In other words, the frequency synthesizer 126 is formed by the PLL circuit having the programmable frequency divider, and in a normal mode, generates the recording and/or reproducing reference clock having a frequency fo based on fo=(m/n) fi according to a frequency dividing ratio m/n which is set by the MPU 112 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 126.

The read data demodulated in the read/write LSI circuit 120 is supplied to the read system of the ODC 114, and after carrying out the reverse conversion of the 1–7 RLL, the CRC and the ECC processes are carried out by the encoding function of the ECC processor 114-2 so as to restore the original NRZ data. Next, the formatter 114-1 connects and converts the NRZ sector data into the NRZ data stream, and this NRZ read data stream is transferred to the host unit via the memory 118 and the interface 117.

A detection signal from a temperature sensor 136 provided in the enclosure 111 is supplied with respect to the MPU 112 via the DSP 116. Based on an environmental temperature within the optical disk unit detected by the temperature sensor 136, the MPU 112 controls the light emission powers for the read, write and erase in the laser diode control circuit 122 to optimum values.

The MPU 112 controls a spindle motor 140 provided in the enclosure 111 via the DSP 116 and a driver 138. In this embodiment, since the ZCAV system is employed as the recording format of the optical disk, the spindle motor 140 is rotated at a constant speed of 3637 rpm, for example.

In addition, the MPU 112 controls an electromagnet 144 provided in the enclosure 111 via the DSP 116 and a driver 142. The electromagnet 144 is arranged on a side opposite to the side of the optical disk on which the laser beam is irradiated within the optical disk unit which is loaded with this optical disk. This electromagnet 144 supplies an external magnetic field on the optical disk at the time of the recording and erasure. In the case of the optical disk having the 1.3 GB or 2.3 GB format employing the MSR, the electromagnet 144 also supplies the external magnetic field on the optical disk at the time of the MSR reproduction.

The DSP 116 is provided with a servo function for positioning the laser beam from the laser diode 130-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 112 with respect to a host command.

In order to realize the servo function of the DSP 116, a focus error signal (FES) detector 145 is provided in the optical unit of the enclosure 111 so as to detect the laser beam emitted from the laser diode 130-1 and returned via the optical disk. A FES detection circuit 146 generates a FES El from a detection signal received from the FES detector 145, and inputs this FES E1 to the DSP 116.

A tracking error signal (TES) detector 147 is also provided in the optical unit of the enclosure 111 so as to detect the laser beam emitted from the laser diode 130-1 and returned via the optical disk. A TES detection circuit 148 generates a TES E2 from a detection signal received from the TES detector 147, and inputs this TES E2 to the DSP 116. The TES E2 is also input to a track zero crossing (TZC) detection circuit 150, and this TZC detection circuit 150 generates a TZC signal E3 which is input to the DSP 116.

A lens position sensor 154 is provided in the enclosure 111. This lens position sensor 154 detects a position of an object lens through which the laser beam is irradiated on the optical disk. A lens position detection signal (LPOS) E4 from the lens position sensor 154 is input to the DSP 116. The DSP 116 controls and drives a focus actuator 160, a lens actuator 164 and a voice coil motor (VCM) 168 via corresponding drivers 158, 162 and 166, so as to control the position of a beam spot formed by the laser beam on the optical disk.

Figure 2:
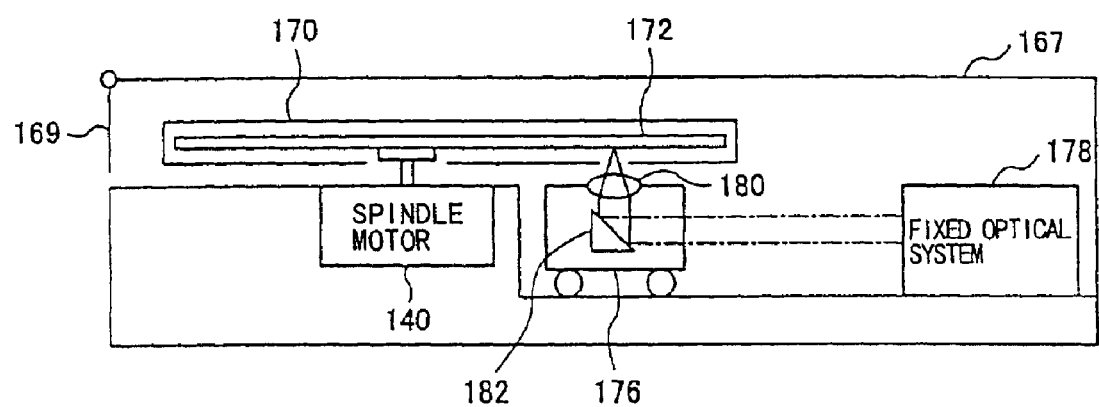
FIG. 2 is a cross sectional view showing a general structure of an enclosure.

FIG. 2 is a cross sectional view showing the general construction of the enclosure 111. As shown in FIG. 2, the spindle motor 140 is provided within a housing 167. By inserting a MO cartridge 170 into the housing 167 from the side of an inlet door 169, an optical disk (MO disk) 172 accommodated within the MO cartridge 170 engages a rotary shaft of the spindle motor 140, thereby loading the optical disk 172 with respect to the optical disk unit.

A carriage 176 is provided below the loaded optical disk 172 within the MO cartridge 170. This carriage 176 is freely movable in a direction which traverses tracks on the optical disk 172 when driven by the VCM 164. An objective lens 180 is mounted on the carriage 176. The laser beam emitted from the laser diode 130-1 which is provided within a fixed optical system 178 is reflected by a mirror 182, and is irradiated on the recording surface of the optical disk 172 via the objective lens 180, thereby forming a beam spot on the recording surface.

The movement of the objective lens 180 along an optical axis is controlled by the focus actuator 160 of the enclosure shown in FIG. 1. In addition, the objective lens 180 is movable in a radial direction which traverses the tracks on the optical disk 172 by the lens actuator 164, within a range of several tens of tracks. The position of the objective lens 180 mounted on the carriage 176 is detected by the lens position sensor 154 shown in FIG. 1. The lens position sensor 154 outputs the lens position detection signal E4 which takes a value zero at a neutral position where the optical axis of the objective lens 180 is perpendicular to the recording surface of the optical disk 172, and has a magnitude and a polarity depending on the amount the optical axis of the objective lens 180 moves towards the inner or outer peripheral side of the optical disk 172.

Figure 3:
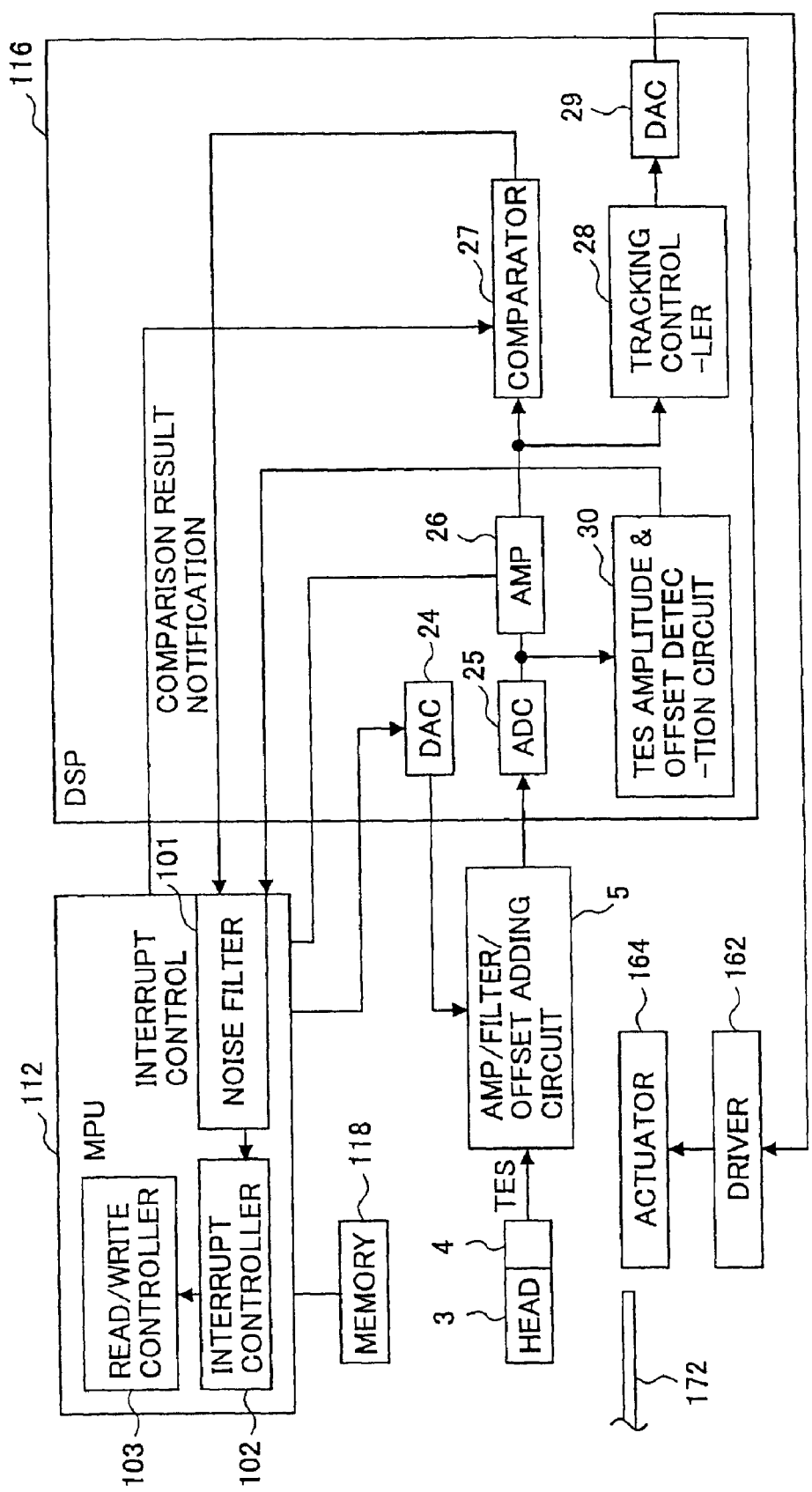
FIG. 3 is a system block diagram showing an important part of the first embodiment of the storage apparatus.

FIG. 3 is a system block diagram showing an important part of this first embodiment of the storage apparatus according to the present invention. In this first embodiment of the storage apparatus, the present invention is applied to a magneto-optical disk unit which uses a magneto-optical disk employing the land-groove recording system. In addition, this first embodiment of the storage apparatus employs a first embodiment of a seek control method according to the present invention. In FIG. 3, those parts which are the same as those corresponding parts in FIGS. 1 and 2 are designated by the same reference numerals, and a description thereof will be omitted.

In FIG. 3, the magneto-optical disk unit generally includes the MPU 112, the digital signal processor (DSP) 116, an optical head 3, a photodetector section 4, an amplifier and filter and offset adding circuit (amplifier/filter/offset adding circuit) 5, the driver 162, the actuator 164 and the memory 118.

The MPU 112 includes the functions of a noise filter 101, an interrupt controller 102, and a read/write controller 103. The memory 118 includes a ROM region and a RAM region. The ROM region stores programs which are executed by the MPU 112 and various data such as tables, while the RAM region stores data such as intermediate results of calculations made by the MPU 112.

The DSP 116 generally includes a digital-to-analog converter (DAC) 24, an analog-to-digital converter (ADC) 25, an amplifier 26, a comparator 27, a tracking controller 28 including a phase compensation filter function, a DAC 29, and a tracking error signal (TES) amplitude and offset detection circuit 30. The magneto-optical disk 172 may be free to be loaded into and unloaded from the magneto-optical disk unit, that is, detachable with respect to the magneto-optical disk unit. For the sake of convenience, FIG. 3 only shows portions of the firmware and the hardware of the DSP 116 related to the setting of the slice level which is used to detect the off-track of the light beam.

A focus control system, a magneto-optical disk driving system, a read/write signal processing system and the like are not directly related to the subject matter of the present invention, and the illustration of such systems is omitted in FIG. 3. In addition, the basic structure of the magneto-optical disk unit is not limited to the basic structure shown in FIG. 3, and various known basic structures may be employed instead as long as a processor such as the DSP 116 is capable of carrying out the operations which will be described hereunder.

In FIG. 3, a light beam is irradiated on the magneto-optical disk 172 by the optical head 3, and of the light beam which is reflected from the magneto-optical disk 172, a light component which is used for tracking control is detected by the photodetector section 4. Hence, the TES is supplied to the ADC 25 within the DSP 116 via the amplifier/filter/offset adding circuit 5. The optical head 3 and the photodetector section 4 correspond to the laser diode unit 130, the ID/MO detector 132, the head amplifier 134, the FES detector 145 and the TES detector 147 shown in FIG. 1. The amplifier/filter/offset adding circuit 5 is provided with an amplifying function, a filtering function, and an offset adding function. The ADC 25 supplies the digitally converted TES to the amplifier 26 and the TES amplitude and offset detection circuit 30. The TES amplitude and offset detection circuit 30 detects a positive peak value and a negative peak value of the TES, and supplies the detected peak values to the MPU 112.

Based on the positive and negative peak values supplied from the TES amplitude and offset detection circuit 30, the MPU 112 supplies an offset amount to the amplifier/filter/offset adding circuit 5 via the DAC 24 within the DSP 116 so that the tracking control is carried out in a vicinity of zero TES, so as to correct the offset of the TES, and also controls the gain of the amplifier 26 within the DSP 116 so that the amplitude of the TES becomes a prescribed amplitude. As will be described later, the gain of the amplifier 26 is switched between a RAM region and a ROM region of the magneto-optical disk 172. Hence, a normalized TES in which a deviation amount with respect to the level of the TES is normalized, is obtained from the amplifier 26 and supplied to the comparator 27.

The normalized TES from the amplifier 26 is also supplied to the tracking controller 28. The tracking controller 28 carries out a phase compensation and the like with respect to the normalized TES, and outputs a positional error with respect to a tracking target. This positional error is supplied to the actuator 164 via the DAC 29 and the driver 162 so as to control the actuator 164 by a known method, in order to control the optical head 3, that is, to carry out the tracking control with respect to the light beam.

At the time of a read, the MPU 112 sets a read slice level which is appropriate for detecting an off-track during the read. In addition, at the time of the write/erase, the MPU 112 sets a write/erase slice level which is calculated and is used for detecting the off-track during the write/erase. Furthermore, the MPU 112 supplies the read slice level to the comparator 27 during the read, and supplies the write/erase slice level to the comparator 27 during the write/erase.

At the time of the read, the comparator 27 compares to determine whether the normalized TES from the amplifier 26 exceeds the read slice level which is obtained from the MPU 112, and reports the comparison result to the MPU 112. Similarly, at the time of the write/erase, the comparator 27 compares to determine whether the normalized TES from the amplifier 26 exceeds the write/erase slice level which is obtained from the MPU 112, and reports the comparison result to the MPU 112. When the comparison result reported from the comparator 27 indicates that the normalized TES exceeds the read slice level (off-track report) at the time of the read, the MPU 112 recognizes an off-track, and makes an error notification or the like with respect to the read/write controller 103 in response to the off-track error report. On the other hand, when the comparison result reported from the comparator 27 indicates that the normalized TES exceeds the write/erase slice level (off-track report) at the time of the write/erase, the MPU 112 recognizes an off-track, and an interrupt is generated with respect to the write/erase process in response to the off-track report, so as to immediately discontinue the write/erase process of the read/write controller 103 by the interrupt controller 102 and prevent data destruction on the magneto-optical disk 172.

Figure 4:
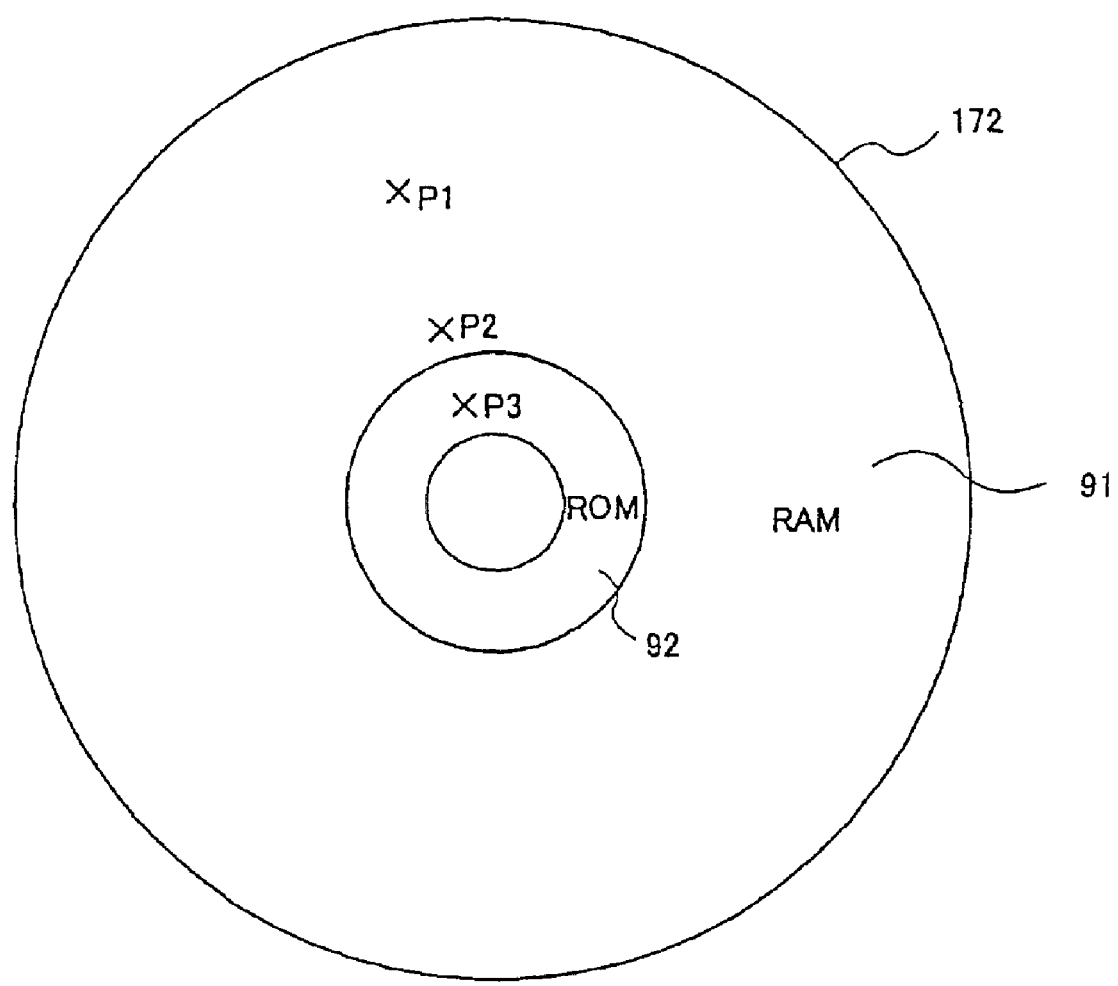
FIG. 4 is a diagram showing a recording region on a magneto-optical disk.

FIG. 4 is a diagram showing a recording region on a recording surface of the magneto-optical disk 172. As shown in FIG. 4, a ROM region (control track region or control region) 92 is provided in an inner peripheral zone on the recording surface, and a RAM region (user data track region or data region) 81 is provided in other zones on the recording surface. Control information such as information peculiar to the medium, a number of bytes per sector, a storage capacity, a recording system and a laser power is recorded in the ROM region 92. Data is recorded on and/or reproduced from the RAM region 91. The recording system includes the land recording system, the land-groove recording system, the overwrite recording system and the like. The information peculiar to the medium includes a manufacturer name, a storage capacity, various parameters and the like of the magneto-optical disk 172. In the ROM region 92, the control information is recorded as variations in geometrical configuration such as pits, concavo-convex patterns formed by combinations of holes and protections, and the like, and the control information is reproduced by an optical reproducing system by detecting variations in the amount of reflected light from the magneto-optical disk 172. On the other hand, in the RAM region 91, the data is recorded and reproduced by a magneto-optical system. In the RAM region and the ROM region 92, the land and the groove are alternately provided in a radial direction of the magneto-optical disk 172, and a track is formed on both the land and the groove. Of course, the location of the ROM region 92 is not limited to the inner peripheral zone, and may for example be provided in an outer peripheral zone on the recording surface of the magneto-optical disk 172.

Figure 5:
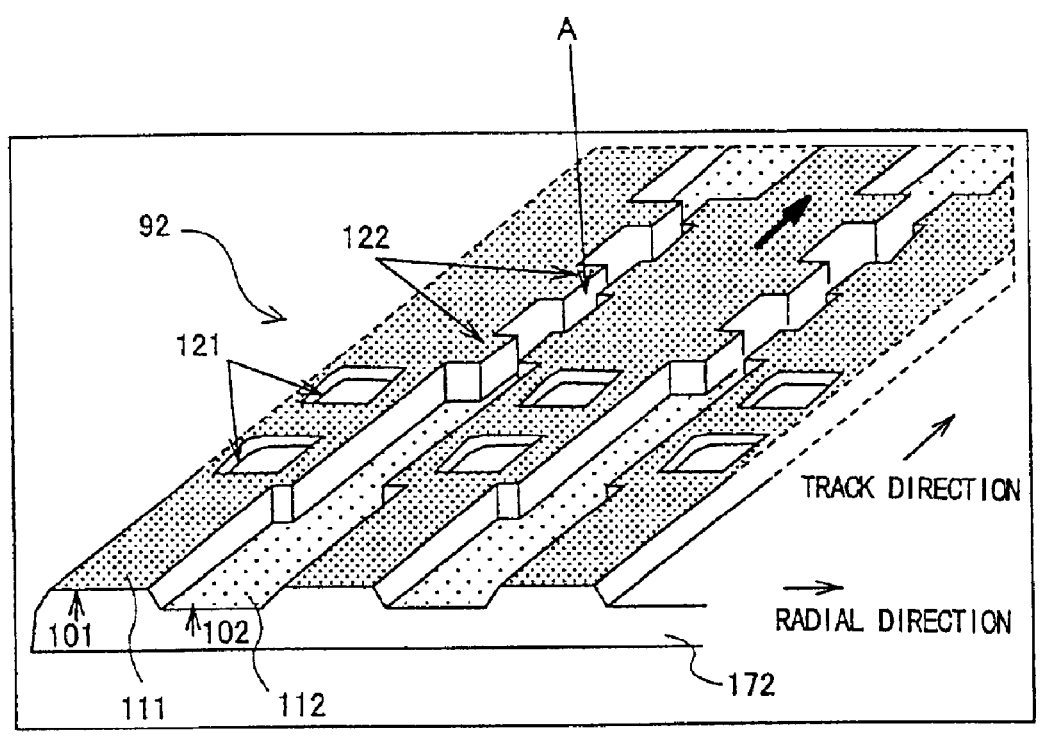
FIG. 5 is a diagram showing a ROM region on the magneto-optical disk.

FIG. 5 is a diagram showing the ROM region 92 on the recording surface of the magneto-optical disk 172. As shown in FIG. 5, the control information is recorded by pits 121 on a track 111 which is formed on a land 101 (hereinafter referred to as a land track 111). On the other hand, the control information is recorded by a projecting portion 122 on a track 112 which is formed in a groove 102 (hereinafter referred to as a groove track 112). In this embodiment, a depth of the pit 121 and a depth of the groove 102 are approximately the same, and a height of the projecting portion 122 and a height of the land 101 are approximately the same. Between two mutually adjacent tracks, the pits 121 and the projecting portions 122 are staggered in a direction in which the tracks extend, by employing the so-called staggered format, so as to suppress the effects of crosstalk between the adjacent tracks. In FIG. 5, the projecting portion 122 of the groove track 112 does not completely fill the groove 102 in order to improve the reproducing sensitivity of the control information, but it is of course possible to completely fill the groove 102 by the projecting portion 122.

Figure 6:
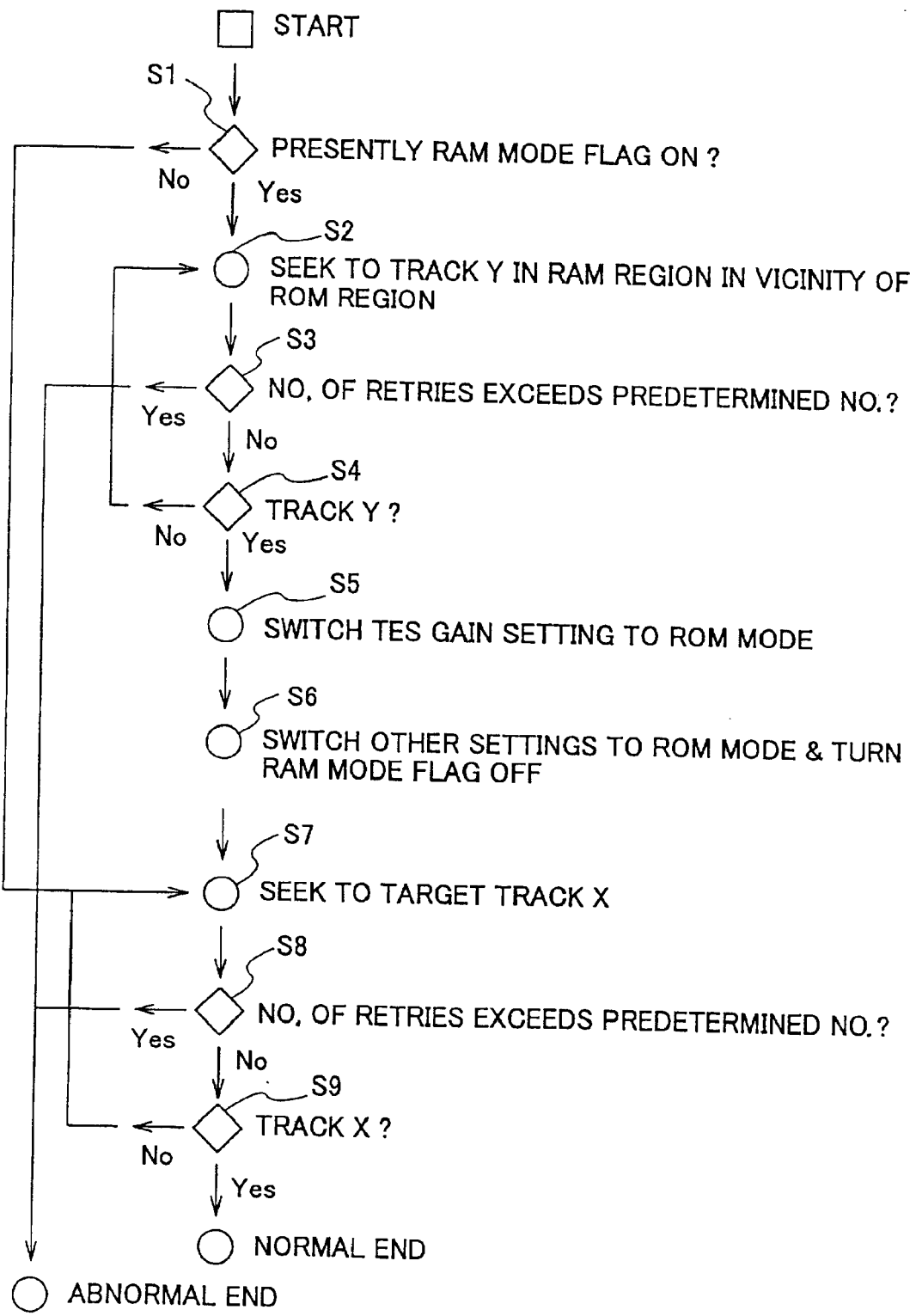
FIG. 6 is a flow chart for explaining an operation of the first embodiment of the storage apparatus.

FIG. 6 is a flow chart for explaining an operation of the MPU 112 in this first embodiment of the storage apparatus. The process shown in FIG. 6 is started when the host unit issues a seek command, for example, and a target track X is instructed.

Figure 7:
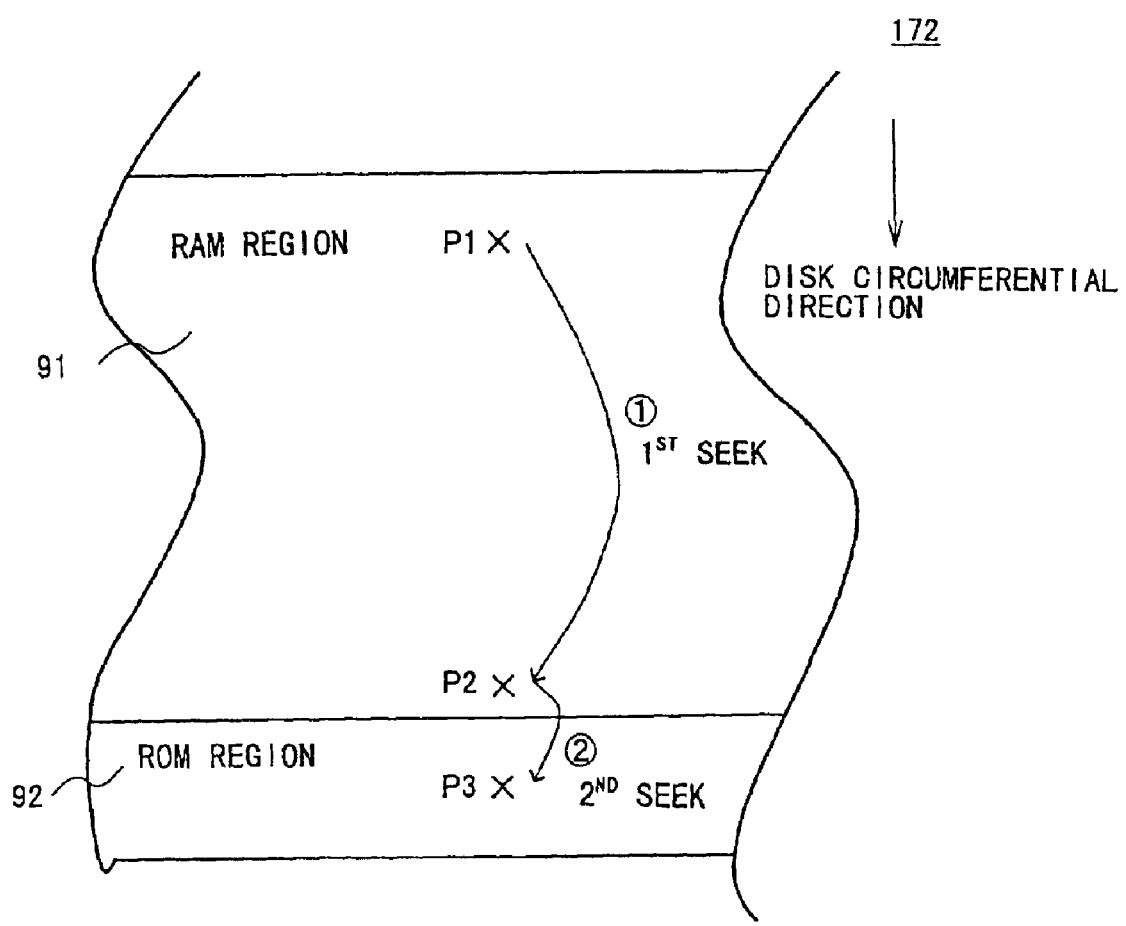
FIG. 7 is a diagram for explaining a seek from a RAM region to the ROM region.

It is assumed for the sake of convenience that the light beam spot from the optical head 3 is located on an arbitrary track within the RAM region (user data track region) 91 of the magneto-optical disk 172, and that the target track X instructed by the seek command is located within the ROM region (control track region) 92. FIG. 7 is a diagram for explaining a seek from the RAM region 91 to the ROM region 92 in this case. In FIG. 7, P1 indicates a light beam spot position (scanning position) on the arbitrary track within the RAM region 91, that is, a seek start position. P2 indicates a light beam spot position on a track Y within the RAM region 91, which will be described later, and is in a vicinity of the ROM region 92, that is, a seek switching position. P3 indicates a light beam spot position on the target track X within the ROM region 92, that is, a seek end (or seek target) position.

In FIG. 6, a step S1 decides whether or not a RAM mode flag is ON. The RAM mode flag is turned ON if the present position of the light beam spot on the magneto-optical disk 172, that is, the address, is within the RAM region 91, and is turned OFF if the address is within the ROM region 92. The RAM mode flag is managed within the MPU 112. The address can be recognized by reading the header which is recorded as variations in geometrical configuration on the magneto-optical disk 172. If the decision result in the step S1 is YES, a step S2 carries out a seek to the track Y which is within the RAM region 91 and is in the vicinity of the ROM region 92.

In a case where the magneto-optical disk 172 is formed by a recording medium of the so-called partial ROM type having RAM and ROM data track regions, it is possible to recognize whether the address is within the RAM region 91 or within the ROM region 92 by reading address management information recorded in a management region on the recording medium when the magneto-optical disk 172 is loaded into the optical disk unit and storing the address management information in the memory 118. In this case, start and end addresses of the RAM region 91 and start and end addresses of the ROM region 92 are registered in the address management information, and it is thus possible to recognize from the address management information whether the seek target position is in the RAM region 91 or the ROM region 92. In addition, it is possible to recognize whether the present position is located within the RAM region 91 or the ROM region 92, by comparing the address of the present position and the address management information read from the memory 118. Further, if the magneto-optical disk 172 used by the optical disk unit is in conformance with a recording medium standard, it is possible to prestore in the memory 118 at the factory the management information indicating the information peculiar to the recording medium and the format structure of the recording medium which are in conformance with the prescribed contents of the recording medium standard. In this case, it is possible to recognize in the MPU 112 and/or the DSP 116 whether the address is within the RAM region 91 or the ROM region 92 based on the prestored management information. The information recorded in the ROM region 92 is not limited to the control information, and some recording media have programs or software recorded as ROM information in the ROM region 91. Accordingly, whether the present position or the seek target position is located within the RAM region 91 or the ROM region 92 may be recognized by methods other than the methods described above.

Therefore, a first seek operation is carried out from the seek start position P1 to the seek switching position P2 shown in FIG. 7. For example, if the number of tracks within the ROM region 92 is 10, the track Y is determined so that the number of tracks from the track Y to the target track X becomes approximately 1000 or less. If the number of tracks within the ROM region 92 is 100, the track Y is determined so that the number of tracks from the track Y to the target track X becomes approximately 10000 or less. In other words, a number of tracks which is counted erroneously increases as the number of tracks traversed by the seek increases. But since the number of tracks which is counted erroneously is tolerated as the number of tracks within the ROM region 92 in which the target track X is located becomes larger, it is possible to increase the number of tracks traversed by a second seek operation which will be described later. Consequently, the track Y only needs to be located within the RAM region 91 at a position which is at least one or more tracks from a boundary of the RAM region 91 and the ROM region 92.

After the step S2, a step S3 decides whether or not a number of retries of the seek exceeds a predetermined number. If the decision result in the step S3 is NO, a step S4 decides whether or not the track Y is reached, and the process returns to the step S2 if the decision result in the step S4 is NO. Of course, the present scanning position can be detected by a known method which counts the number of tracks traversed by use of the TES. On the other hand, if the decision result in the step S4 is YES, a step S5 switches the TES gain to that for the ROM mode. When the mode of the magneto-optical disk unit is the RAM mode, the MPU 112 controls the gain of the amplifier 26 so as to set the TES gain to that for the RAM mode. However, when the mode of the magneto-optical disk unit becomes the ROM mode, the MPU 112 switches and controls the gain of the amplifier 26 so as to set the TES gain to that for the ROM mode. The TES gain for the ROM mode is set larger than the TES gain for the RAM mode. Hence, it is possible to prevent an off-track state or an off-focus state which would otherwise be generated due to unstable servo caused by the small TES amplitude at the target track X.

After the step S5, a step S6 switches the read parameters and other settings to those for the ROM mode, and turns OFF the RAM mode flag. More particularly, the settings are switched so that the ROM region 92 can be read with a high accuracy, by reducing the power of the light beam or reducing the zero crossing hysteresis level of the TZC detection circuit 150 to set the zero crossing detection level to a small value, and by setting the slice level for the off-track detection to a large value. After the step S6 or, if the decision result in the step S1 is NO, a step S7 carries out a seek to the target track X within the ROM region 92. Hence, the second seek operation from the seek switching position P2 to the seek end position P3 shown in FIG. 7 is carried out.

A step S8 decides whether or not the number of retries of the seek exceeds a predetermined value. If the decision result in the step S8 is NO, a step S9 decides whether or not the target track X is reached, and the process normally ends if the decision result in the step S9 is YES. If the decision result in the step S9 is NO, the process returns to the step S7.

If the decision result in the step S3 or the step S8 is YES, the process abnormally ends, and the abnormal end is notified to the host unit.

The seek from the track within the ROM region 92 to the track within the RAM region 91 is carried out by one seek operation, as will be described later in conjunction with a fourth embodiment. In this first embodiment, the seek from the RAM region 91 to the ROM region 92 is carried out by a two-stage seek operation, and the seek from the ROM region 92 to the RAM region 91 is carried out by a one-stage seek operation. In other words, the seek from the RAM region 91 to the ROM region 92 and the seek from the ROM region 92 to the RAM region 91 use different seek control methods.

When the seek target position is located within the ROM region 92, the first seek is carried out by regarding the seek switching position as a first end position (first target position) to achieve an on-track state with respect to the first end position, and after carrying out the various switchings, the second seek is carried out by regarding the seek target position as a second end position (second target position) to achieve an on-track state with respect to the second end position. If the seek fails during the first and second seeks and the on-track state cannot be achieved with respect to the corresponding first and second end positions (first and second target positions), the seek is carried out again, but when this seek which is carried out again is not taken into consideration, two seek operations (that is, a two-stage seek) are carried out in this case.

If the seek target position is located within the RAM region 91, the seek is carried out by regarding the seek target position as the end position to achieve an on-track state with respect to the end position. If the seek fails and the on-track state with respect to the end position (seek target position) cannot be achieved, the seek is carried out again. But when this seek which is carried out again is not taken into consideration, one seek operation (that is, a one-stage seek) is carried out in this case.

In this embodiment, a ratio of the TES amplitudes when scanning the RAM region 91 of the magneto-optical disk 172 and when scanning the ROM region 92 of the magneto-optical disk 172 is 1:0.4 as described above, and thus, the TES gain is appropriately switched and set to 2.5 times. For this reason, when detecting the arrival to the desired track by counting the number of tracks traversed from the time when the light beam spot starts to move from the arbitrary track by use of the TES, an error is not easily generated when counting the number of tracks traversed.

Moreover, since an error is not easily generated when counting the number of tracks traversed, it is possible to suppress the retry of the seek (seek retry) and to reduce the time required to carry out the seek. Especially when loading the magneto-optical disk 172 into the magneto-optical disk unit, it is first necessary to make a seek to the ROM region 92 in order to read the control information such as the storage capacity and the disk type. In this first embodiment, this seek can be carried out within a short time.

Furthermore, if the circuit were designed to suit the TES amplitude obtained from the RAM region 91, the TES would not be detected correctly from the ROM region 92, and the tracking servo would not be carried out normally in the ROM region 92. Similarly, if the circuit were designed to suit the TES amplitude obtained from the ROM region 92, the TES would not be detected correctly from the RAM region 91, and the tracking servo would not be carried out normally in the RAM region 91. Therefore, in either case, it would become impossible to obtain an on-track state with respect to the desired track. But according to this embodiment, it is possible to completely eliminate such problems.

Figure 8:
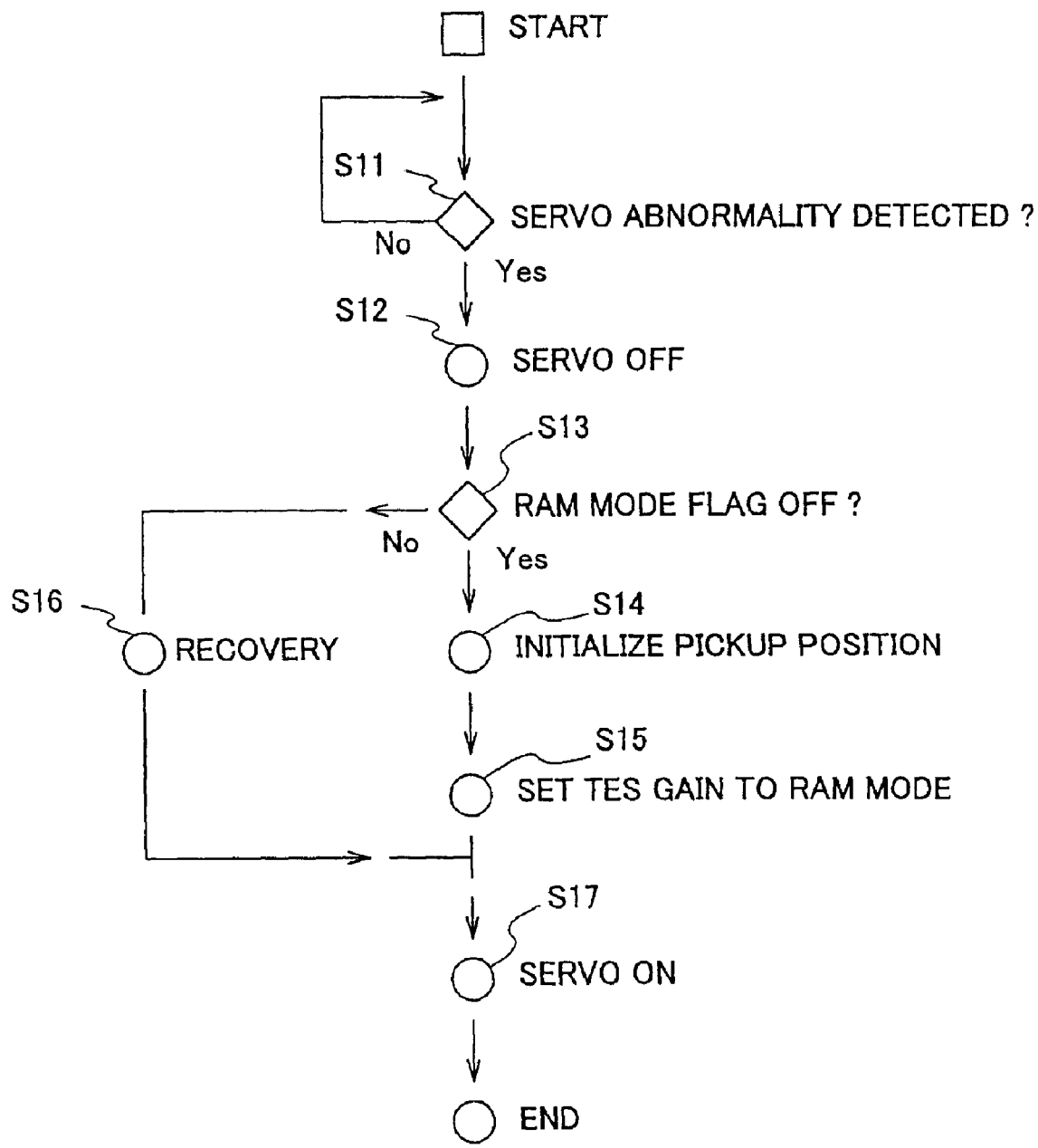
FIG. 8 is a flow chart for explaining an operation of a second embodiment of the storage apparatus according to the present invention.

FIG. 8 is a flow chart for explaining an operation of a second embodiment of the storage apparatus according to the present invention. The basic structure of this second embodiment of the storage apparatus and the basic structures of third and fourth embodiments of the storage apparatus which will be described later may be the same as the basic structure of the first embodiment of the storage apparatus shown in FIG. 3 described above, and a description and illustration thereof will be omitted.

The process shown in FIG. 8 is carried out when an off-track state is generated during a seek in which a servo error or abnormality (hereinafter simply referred to as a servo abnormality) occurs in the tracking servo or focus servo. In FIG. 8, a step S11 decides whether or not a servo abnormality is detected, by notifying the interrupt controller 102 within the MPU 112 when the comparison result obtained by the comparator 27 shown in FIG. 3 is abnormal, for example. The structure and principle used to detect the tracking servo error are known from Japanese Laid-Open Patent Applications No. 5-189797 and No. 10-275352, for example, and the structure and principle used to detect the focus servo error are known from Japanese Laid-Open Patent Applications No. 4-195734 and No. 2-61829, for example.

If the decision result in the step S11 is YES, a step S12 turns OFF the tracking servo and the focus servo. In addition, a step S13 decides whether or not the RAM mode flag is OFF. If the decision result in the step S13 is YES, a step S14 initializes the pickup position, that is, initializes the position of the optical head 3. A step S15 controls the gain of the amplifier 26 so as to set the TES gain to that for the RAM mode, and the process advances to a step S17 which will be described later.

On the other hand, if the decision result in the step S13 is NO, a step S16 carries out a known recovery process which is normally carried out, and the process advances to the step S17. The step S17 turns ON the tracking servo and the focus servo, and the process ends.

When the off-track state is generated in the magneto-optical disk unit due to the servo abnormality, there is a high probability that the scanning position will reach the RAM region 91, because the ROM region 92 is small compared to the RAM region 91 of the magneto-optical disk 172 and the optical head 3 has a characteristic such that the optical head 3 tends to return to the central zone of the magneto-optical disk 172. However, when the scanning position reaches the RAM region 91 and the TES gain is still set to that for the ROM mode, the TES amplitude becomes too large and the circuit will oscillate, and there is a possibility that a long time will be required for the recovery process. Hence, in this second embodiment, the TES gain is immediately switched and set to that for the RAM mode when the servo abnormality is detected during the on-track state within the ROM region 92, so as to maintain the on-track state.

Figure 9:
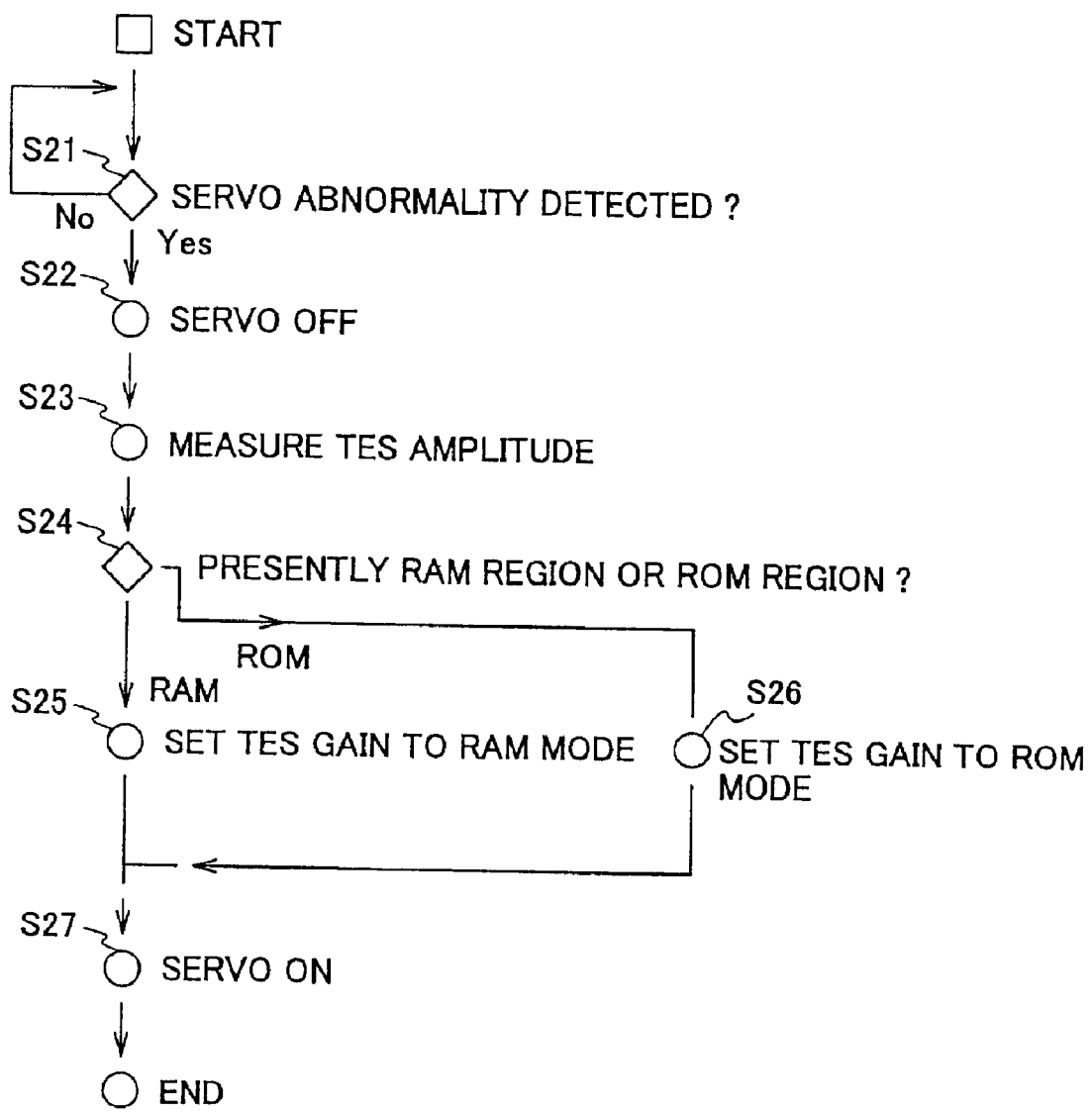
FIG. 9 is a flow chart for explaining an operation of a third embodiment of the storage apparatus according to the present invention.

FIG. 9 is a flow chart for explaining an operation of the third embodiment of the storage apparatus according to the present invention. The process shown in FIG. 9 is carried out when an off-track state is generated by the servo abnormality of the tracking servo or the focus servo during the seek, for example.

In FIG. 9, a step S21 decides whether or not a servo abnormality is detected, by use of a known method. If the decision result in the step S21 is YES, a step S22 turns OFF the tracking servo and the focus servo. In addition, a step S23 measures the TES amplitude, and a step S24 decides whether the present scanning position is located within the RAM region 91 or the ROM region 92, based on the measured TES amplitude. The TES amplitude can be recognized within the MPU 112 based on the detection result from the TES amplitude and offset detection circuit 30 shown in FIG. 3. The MPU 112 judges that the present scanning position is located within the RAM region 91 if the TES amplitude is relatively large, and judges that the present scanning position is located within the ROM region 92 if the TES amplitude is relatively small.

If the step S24 judges that the present scanning position is located within the RAM region 91, a step S25 controls the gain of the amplifier 26 so as to set the TES gain to that for the RAM mode, and the process advances to a step S27 which will be described later. On the other hand, if the step S24 judges that the present scanning position is located within the ROM region 92, a step S26 controls the gain of the amplifier 26 so as to set the TES gain to that for the ROM mode, and the process advances to the step S27. The step S27 turns ON the tracking servo and the focus servo, and the process ends.

Figure 10:
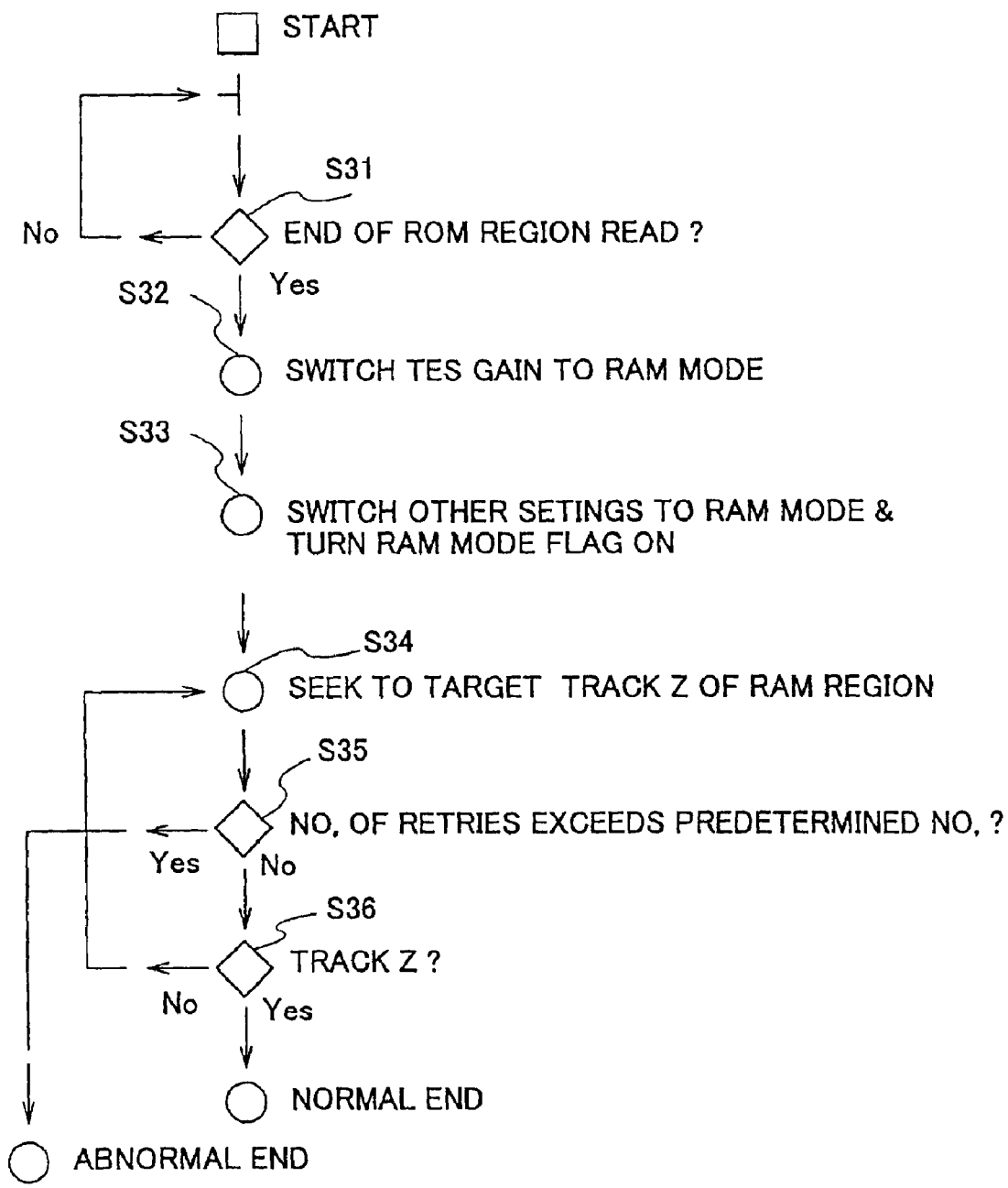
FIG. 10 is a flow chart for explaining an operation of a fourth embodiment of the storage apparatus according to the present invention.

FIG. 10 is a flow chart for explaining an operation of the fourth embodiment of the storage apparatus according to the present invention. The process shown in FIG. 10 is carried out when a read from the target track X within the ROM region 92 ends during the seek, for example.

In FIG. 10, a step S31 decides whether or not a read from the track X within the ROM region 92 of the magneto-optical disk 172 has ended. If the decision result in the step S31 is YES, a step S32 controls the gain of the amplifier 26 so as to set the TES gain to that for the RAM mode. A step S33 switches the read parameters and other settings to those for the RAM mode, and turns ON the RAM mode flag. A step S34 carries out a seek to a target track Z within the RAM region 91 by one seek operation. The target track Z within the RAM region 91 may be set arbitrarily in advance, and may be set for example to a track in approximately the central portion along the radial direction of the RAM region 91. A step S35 decides whether or not a number of retries of the seek exceeds a predetermined value. If the decision result in the step S35 is NO, a step S36 decides whether or not the target track Z is reached, and the process normally ends if the decision result in the step S36 is YES. If the decision result in the step S36 is NO, the process returns to the step S34. If the decision result in the step S35 is YES, the process abnormally ends, and the abnormal end is notified to the host unit.

In a case where the ROM region 92 is provided in the inner peripheral portion of the magneto-optical disk 172 and the on-track state is maintained ever after the read from the track within the ROM region 92 ends, the servo stops at the point in time when the track within the ROM region 92 ends to result in an off-track state, and it takes time to restore the on-track state. A similar phenomenon also occurs in a case where the ROM region 92 is provided in the outer peripheral portion of the magneto-optical disk 172. Hence, in this fourth embodiment, the seek to the RAM region 91 is carried out immediately when the read from the ROM region 92 ends, so that the on-track state can be maintained even after the read from the ROM region 92 ends.

Of course, it is possible to appropriately combine the first through fourth embodiments described above.

Each of the embodiments described above takes into consideration the compatibility of the storage apparatus according to the present invention and the conventional storage apparatus. In other words, the functions of the present invention are made not to operate with respect to a low-density recording medium having a storage capacity of less than 2.3 GB, for example. But if the compatibility of the storage apparatus according to the present invention and the conventional storage apparatus does not need to be taken into consideration, the functions of the present invention may be made to operate with respect to the low-density recording medium. In this case, the method of judging the type of recording medium is not limited to the method of judging the type from the pits of the ID portion as described above, and it is possible to employ other methods such as a method which reads media information from a control information region of the recording medium.

In addition, the application of the present invention is not limited to the magneto-optical disk unit, and the present invention is similarly applicable to various kinds of storage apparatuses including storage apparatuses which use optical recording media of the magneto-optical, phase change type and the like employing systems different from that described above, such as CR-R, CD-RW, DVD-RAM having the RAM and ROM regions, and storage apparatuses which use a light beam to record information on a magnetic recording medium as variations in magneto-optical properties.

Further, the present invention is not limited to these embodiments, but various variations and modifications may be made without departing from the scope of the present invention.

What is claimed is:

1. A seek control method for carrying out a seek to a target position on a recording medium by moving a light beam spot which is irradiated on the recording medium, said recording medium having a first region in which information recording is made as variations in optical or magneto-optical properties and a second region in which information recording is made as variations in geometrical configuration, said first and second regions being provided in different areas on a recording surface of the recording medium, said seek control method comprising the steps of:

(a) carrying out a control so that a seek operation from a seek start position within the first region to a seek target position within the second region and a seek operation from a seek start position within the second region to a seek target position within the first region differ; and (b) judging a type of the recording medium, said step (a) carrying out a different seek operation when said step (b) judges that the recording medium is a high-density recording medium.

2. The seek control method as claimed in claim 1, wherein said step (a) carries out a first seek operation from a seek start position to a first end position within the first region and in a vicinity of the second region when the seek start position is within the first region and a seek target position is within the second region, and carries out a second seek operation from the first end position to a second end position by regarding the second end position as the seek target position.

3. The seek control method as claimed in claim 1, wherein said step (a) carries out a seek from a seek start position to an end position in one seek operation by regarding the end position as a seek target position when the seek start position is within the second region and the seek target position is within the first region.

4. The seek control method as claimed in claim 1, further comprising the step of:

(c) judging whether a present position is within the first region or the second region based on an amplitude of a tracking error signal when a servo abnormality is detected in an on-track state, setting a gain of the tracking error signal to that for the first region if the present position is within the first region, and setting the gain of the tracking error signal to that for the second region if the present position is within the second region.

5. The seek control method as claimed in claim 1, further comprising the step of:

(c) setting a gain of a tracking error signal to that for the first region after a read within the second region ends.

6. A seek control method for carrying out a seek to a target position on a recording medium by moving a light beam spot which is irradiated on the recording medium, said recording medium having a first region in which information recording is made as variations in optical or magneto-optical properties and a second region in which information recording is made as variations in geometrical configuration, said first and second regions being provided in different areas on a recording surface of the recording medium, said seek control method comprising the steps of:

(a) carrying out a control to carry out a first seek operation from a seek start position to a first end position within the first region and in a vicinity of the second region when the seek start position is within the first region and a seek target position is within the second region, and to carry out a second seek operation from the first end position to a second end position by regarding the second end position as the seek target position;

(b) setting control parameters to those for the first region during said first seek operation, and setting the control parameters to those for the second region during said second seek operation, wherein said step (a) carries out a seek from a seek start position to an end position in one seek operation by regarding the end position as a seek target position when the seek start position is within the second region and the seek target position is within the first region, and said step (b) sets the control parameters to those for the first region during said one seek operation.

7. The seek control method as claimed in claim 6, wherein the control parameters include at least one of a gain of a tracking error signal, an off-track detection slice, and a power of the light beam.

8. The seek control method as claimed in claim 6, further comprising the step of:

(c) judging whether a present position is within the first region or the second region based on an amplitude of a tracking error signal when a servo abnormality is detected in an on-track state, setting a gain of the tracking error signal to that for the first region if the present position is within the first region, and setting the gain of the tracking error signal to that for the second region if the present position is within the second region.

9. The seek control method as claimed in claim 6, wherein said step (b) sets a gain of a tracking error signal to that for the first region after a read within the second region ends.

10. A storage apparatus for carrying out a seek to a target position on a recording medium by moving a light beam spot which is irradiated on the recording medium, said recording medium having a first region in which information recording is made as variations in optical or magneto-optical properties and a second region in which information recording is made as variations in geometrical configuration, said first and second regions being provided in different areas on a recording surface of the recording medium, said storage apparatus comprising:

a control section carrying out a control so that a seek operation from a seek start position within the first region to a seek target position within the second region and a seek operation from a seek start position within the second region to a seek target position within the first region differ; and a judging section judging a type of the recording medium, said control section carrying out a different seek operation when said judging section judges that the recording medium is a high-density recording medium.

11. The storage apparatus as claimed in claim 10, wherein said control section carries out a first seek operation from a seek start position to a first end position within the first region and in a vicinity of the second region when the seek start position is within the first region and a seek target position is within the second region, and carries out a second seek operation from the first end position to a second end position by regarding the second end position as the seek target position.

12. The storage apparatus as claimed in claim 10, wherein said control section carries out a seek from a seek start position to an end position in one seek operation by regarding the end position as a seek target position when the seek start position is within the second region and the seek target position is within the first region.

13. The storage apparatus as claimed in claim 11, further comprising:

a setting section setting control parameters to those for the first region during the first seek operation and setting the control parameters to those for the second region during the second seek operation.

14. The storage apparatus as claimed in claim 13, wherein the control parameters include at least one of a gain of a tracking error signal, an off-track detection slice, and a power of the light beam.

15. The storage apparatus as claimed in claim 10, further comprising:

a setting section judging whether a present position is within the first region or the second region based on an amplitude of a tracking error signal when a servo abnormality is detected in an on-track state, setting a gain of the tracking error signal to that for the first region if the present position is within the first region, and setting the gain of the tracking error signal to that for the second region if the present position is within the second region.

16. The storage apparatus as claimed in claim 11, herein the first end position is within the first region and separated by at least one or more tracks from a boundary of the first region and the second region, and is closer to the second region than the seek start position.

17. The storage apparatus as claimed in claim 11, further comprising:

a section carrying out a seek to an arbitrary track within the first region by switching and setting a gain of a tracking error signal to that for the first region when a read within the second region ends.

* * * * *